June 1, 1926. 1,586,914
P. W. PALM
WIND MOTOR
Filed Jan. 29, 1925 2 Sheets-Sheet 1

Inventor
P. W. Palm
By Lacy & Lacy, Attorneys

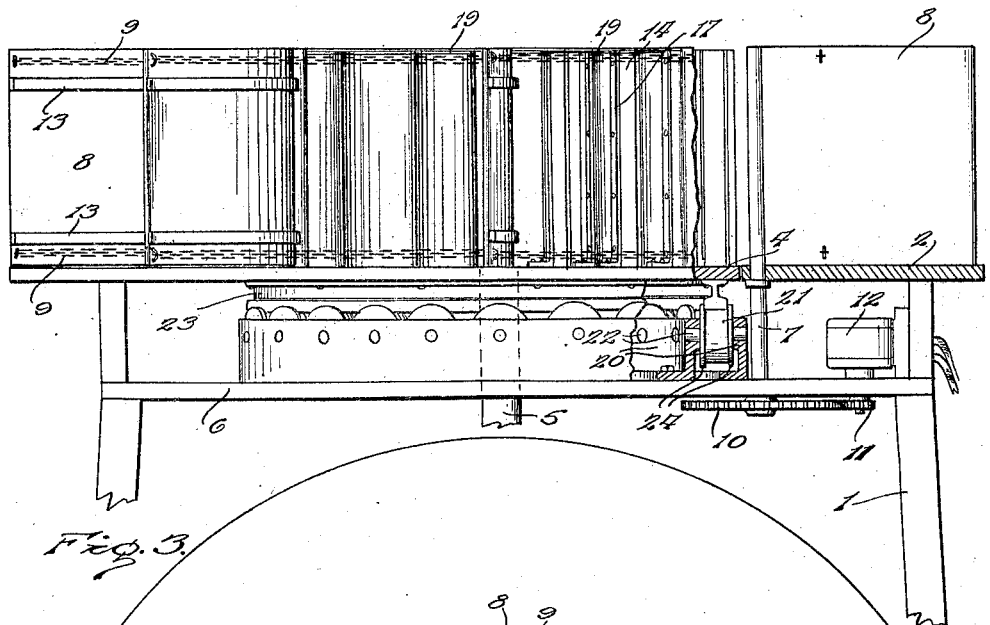
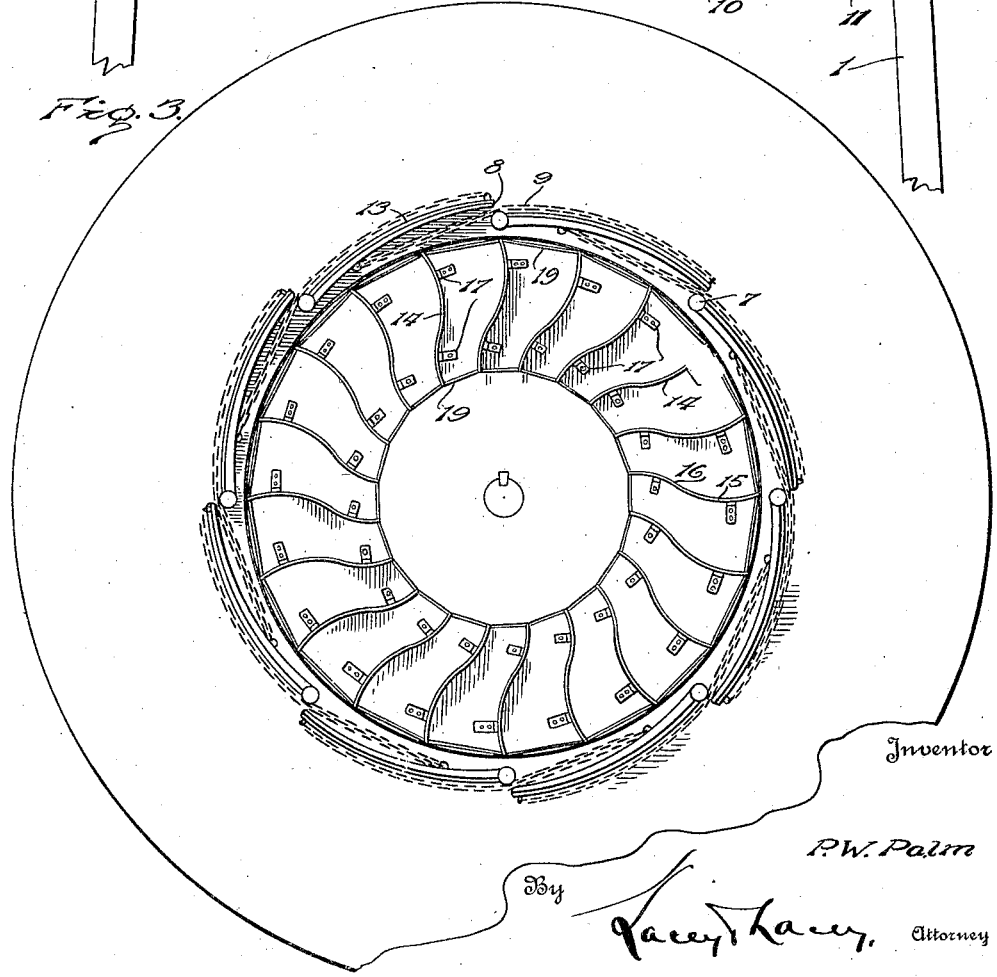

Patented June 1, 1926.

1,586,914

UNITED STATES PATENT OFFICE.

PER W. PALM, OF BAUDETTE, WISCONSIN.

WIND MOTOR.

Application filed January 29, 1925. Serial No. 5,552.

This invention relates to wind propelled motors and has special reference to wind motors in which the rotatable driving member is disposed to rotate in a horizontal plane. One object of the invention is to provide a horizontally rotating wind motor in which the rotor will be so mounted as to move easily and in which the vanes will be of a type to utilize the full force of the wind. Another object of the invention is to provide means whereby the wind may be directed into the rotor to actuate the same in whatever direction it may be flowing or may be entirely cut off when it is not desired to have the motor operate. These objects, and other objects which will incidentally appear in the course of the following description, are attained in such a mechanism as is illustrated in the accompanying drawings, and the invention resides in certain novel features which will be particularly pointed out in the appended claim.

In the drawings:—

Fig. 2 is a side elevation, partly broken away and in section, and

Fig. 3 is a plan view showing the machine arranged to cut off the wind.

Figure 1:
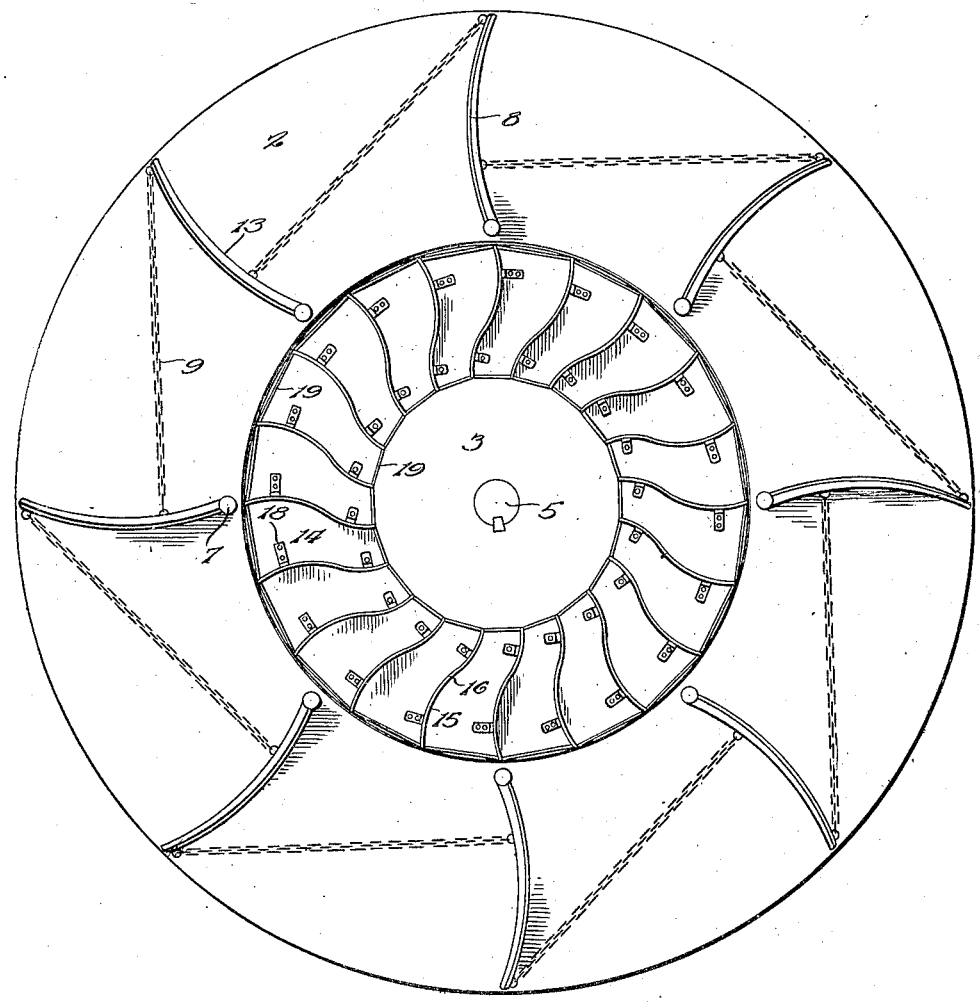
Figure 1 is a plan view of my wind motor showing the same arranged to operate.

In carrying out my invention, I employ a tower or supporting frame, indicated at 1, which may be of any suitable construction which will possess the necessary strength and rigidity. Upon the said frame or tower is secured a stationary platform 2 which is of annular form and concentric with this platform, within the central circular opening of the same, is arranged the rotor 3. The rotor comprises a circular base plate 4 which is rigidly secured to the upper end of a driving shaft 5 journaled in suitable bearings provided therefor at various points in the height of the tower, a deck or beams 6 being provided near the top of the tower to furnish a bearing for the said driving shaft and also aid in supporting the rotor as will presently more fully appear. Mounted at intervals in the deck 6 and in the platform 2 adjacent the inner circular edge of the same are upright shafts 7 to which are secured deflectors or guiding vanes 8 which are adapted to extend outwardly, as shown in Fig. 1, to guide or deflect the wind into the rotor, or be folded together in overlapping relation, as shown in Fig. 3, to cut off the wind. The vanes may be mounted to rotate about the several shafts 7, but I prefer to secure them rigidly to the shafts and mount the shafts for rotation in the deck and the platform. The deflectors or guiding vanes are slightly arcuate in plan view so that, when they are swung outwardly into the open position shown in Fig. 1, the wind will strike upon the concave faces of the guides and will be thereby directed into the rotor across the radii of the same to most effectually act upon the blades of the rotor. To cause the guiding vanes or deflectors to rotate simultaneously, chains or other flexible connections 9 are attached to and extend between the successive vanes so that, when any one vane is swung to either the open or the closed position, the motion will be transmitted through the several chains to all the guides. It will be readily noted that the outer edges of the vanes are further apart than their inner edges when the vanes are open and, therefore, the chains are attached to the outer edges of the vanes which exert the pull upon the chains but are attached at their opposite ends near the inner edges of the respectively succeeding vanes, as clearly shown in Fig. 1, so that the proper pull will be exerted upon the vanes and folding of the chains between the overlapping vanes will be avoided. The guiding vanes or deflectors may be swung to their open or their closed positions by a manually operated handle secured to the lower end of one of the shafts 7 which will be extended to a point near the bottom of the tower to permit the attachment of the handle thereto, but I prefer to secure to one of the shafts immediately below the deck 6 a gear wheel 10 meshing with a pinion 11 on the shaft of a small electric motor 12, the circuit through which may be controlled by any ordinary switch located at the base of the tower. This motor need be of only sufficient power to turn the vanes and may be operated from a battery, but a more convenient means for supplying current will be to connect the driving shaft 5 with a small generator and storage battery which will generate and store sufficient current to operate the motor whenever desired. The guiding vanes may be of sheet metal or other preferred material, and to reinforce them I secure upon the convex faces thereof bracing bars 13 which extend between the side edges of the several vanes and are disposed near the upper and lower ends thereof, as clearly shown in Fig. 2.

The base plate 4 of the rotor carries upon its upper side a plurality of blades or working vanes 14 provided in sufficient number to extend equi-distantly around the entire circular extent of the base plate and they are disposed vertically or at a right angle to the surface of the base plate. These vanes are given the ogee formation clearly shown in Figs. 1 and 3 so as to provide a concave surface 15 in their outer end portions, and a shoulder or abutment portion, indicated at 16, nearer their inner vertical edges. Upon referring to Fig. 1, it will be noted that the wind striking the concave faces of the guiding vanes or deflectors 8 will be turned somewhat to one side and will be directed onto the outer concave portion 15 of the blades 14 and against the portion 16 which extends across the radii of the rotor. The driving force of the wind will be thereby most effectually utilized so that the rotor will be positively driven and will operate efficiently even under a slight breeze. To reinforce the blades, standards or vertical braces 17 are secured to the rear sides thereof relative to the direction of the wind, the said braces or standards being provided with feet 18 at their lower ends which are rigidly secured to the base plate 4 of the rotor. To further reinforce the blades and prevent spreading of the same, rods or stout cables 19 are secured to and extend between the upper ends thereof at their inner and outer edges.

Secured upon the deck 6 below the base plate 4 of the rotor and concentric with the shaft 5 are circular brackets or bearing rings 20 between which are disposed rollers 21 carried by axles 22 which are mounted in the said bearing rings, as shown clearly in Fig. 2. Upon the under side of the base plate 4 is secured a circular track 23 which rests upon the rollers 21 between the peripheral flanges 24 thereof so that the rotor will be supported for rotation and will be prevented from swaying to such an extent as to bind upon the platform 2 or any other supporting parts, the frictional resistance to the operation being minimized and the strain upon the tower and the supporting structure being neutralized.

It is thought the operation of my improved motor will be readily understood from the foregoing description, taken in connection with the accompanying drawings. If the machine is not to operate, the deflectors 8 are swung to the closed overlapping position shown in Fig. 3 and access of the wind to the rotor will be thereby cut off. If, however, it is desired to obtain power from the motor, the guides or deflectors are swung to the open position shown in Fig. 1 and the wind will be then deflected onto the concave outer portions of the several blades of the rotor and will drive the rotor so that the driving shaft 5 will be rotated and the machinery connected therewith operated or power generated and stored for future use. My improved motor is very compact in the arrangement of the parts and is simple in construction so that it will operate easily and is not apt to get out of order, while the full power generated by the motor may be advantageously utilized. The device will be found very advantageous as a means for supplementing water motors in the event that the supply of water should get low, and it will also be found an efficient substitute for steam in localities where fuel is expensive. As before intimated, the driving shaft may be connected with an electric generator so that electric current may be generated and supplied at points of use or may be fed into storage batteries for use as needed.

Having thus described the invention, I claim:—

A wind motor comprising a supporting structure, a rotor mounted upon said supporting structure, a stationary platform carried by said supporting structure and disposed about said rotor, arcuate deflectors pivotally mounted upon said platform and adapted to be swung from an open position substantially radially of the rotor to a closed position with the free end of each deflector overlapping the pivoted end of an adjacent deflector and provide a wind barrier completely surrounding said rotor, flexible connecting members of a permanent length secured at the outer ends of said deflectors and each of a length to extend across the outer face of a deflector and have its other end attached to the inner face of the next adjacent deflector adjacent the pivoted end thereof, said connecting members serving to transmit swinging movement from one deflector to another and brace the deflectors against independent swinging, one deflector having a depending shaft at its inner pivoted end extending below said platform, and means for rotating said shaft to impart swinging movement to said deflectors and effect adjustment thereof.

In testimony whereof I affix my signature.

PER W. PALM. [L. S.]